United States Patent [19]

Grenkowitz

[11] Patent Number: 5,309,366
[45] Date of Patent: May 3, 1994

[54] METHOD OF DEFINING COMPLEX GEOMETRIES TO TRANSPOSE FLOW BOXES INTO PATTERN EQUIPMENT FOR THE PRODUCTION OF AUTOMOTIVE COMPONENTS

[75] Inventor: Robert W. Grenkowitz, Romeo, Mich.

[73] Assignee: Ford Motor Company, Dearborn, Mich.

[21] Appl. No.: 924,803

[22] Filed: Aug. 3, 1992

[51] Int. Cl.⁵ ............................................. G06F 15/46
[52] U.S. Cl. ........................... 364/474.24; 364/474.03
[58] Field of Search ...................... 364/474.03, 474.24; 318/570, 576, 577, 579; 409/93

[56] References Cited

U.S. PATENT DOCUMENTS 5,027,281  6/1991  Rekow et al. .................. 364/474.24

Primary Examiner—Jerry Smith
Assistant Examiner—Paul Gordon
Attorney, Agent, or Firm—Joseph W. Malleck; Roger L. May

[57] ABSTRACT

The present invention provides an improved method for defining complex geometries to transpose geometric surfaces accurately into tooling. The method for entering accurate position data defining geometric surfaces eliminates the entry of erroneous position data at the sharp edges and boundaries of geometric shapes, such as the intersections between geometric tooling surfaces and planar parting surfaces. The method further provides for the creation and interrelation of accurate design, manufacturing, and control data bases which are used to enhance the speed and accuracy with which tooling having geometric surfaces may be designed and produced. The method of the present invention further has a reverse engineering capability which accommodates design improvements, facilitates correction of manufacturing errors in tooling, and permits monitoring and repair of tooling wear more quickly and easily than known methods.

27 Claims, 4 Drawing Sheets

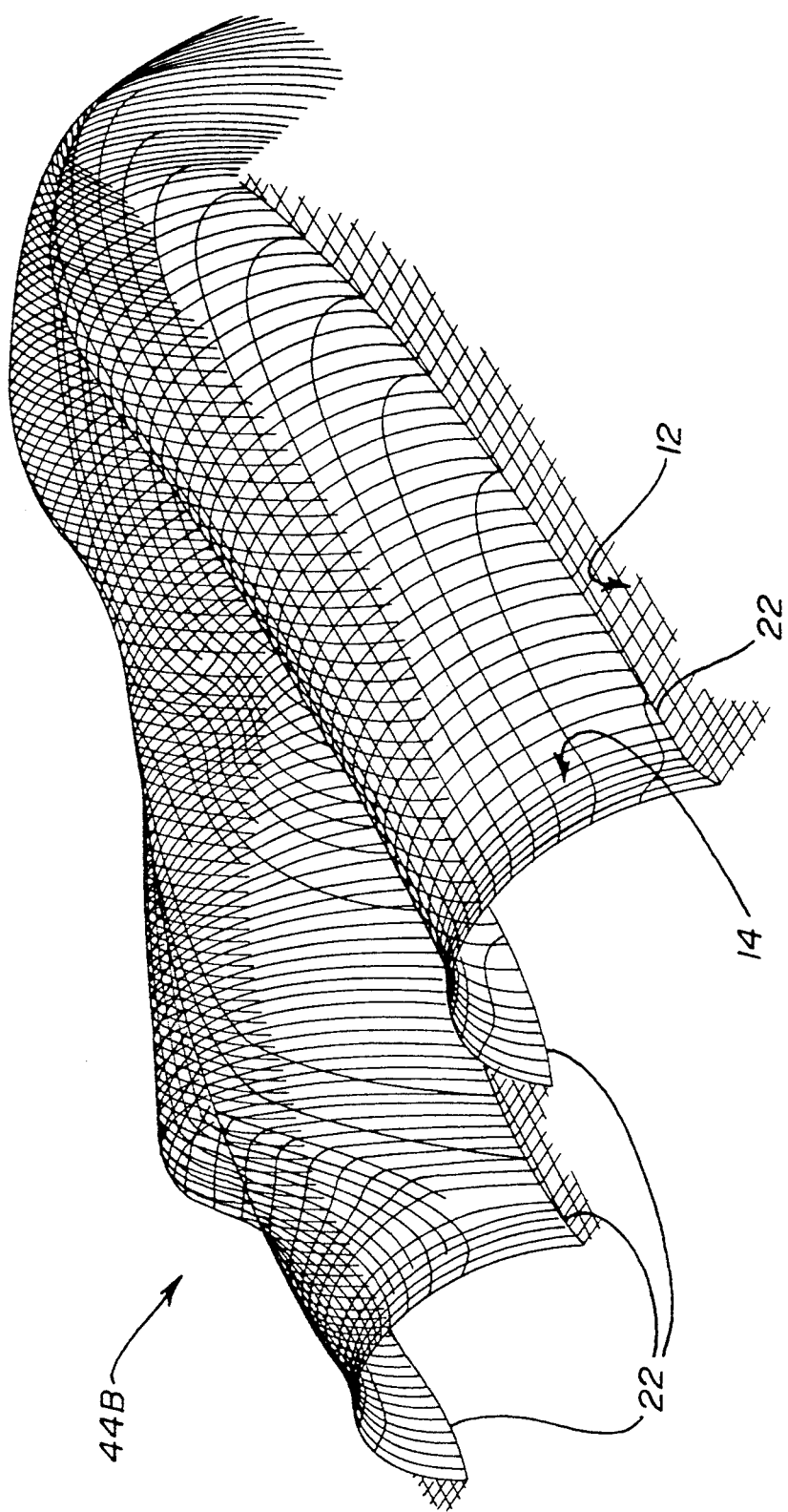

METHOD OF DEFINING COMPLEX GEOMETRIES TO TRANSPOSE FLOW BOXES INTO PATTERN EQUIPMENT FOR THE PRODUCTION OF AUTOMOTIVE COMPONENTS

BACKGROUND OF THE INVENTION

The present invention relates to the production of pattern equipment used in manufacturing, and in particular, to a method for defining complex geometries which are transposed into tooling used to produce automotive components.

Various automotive components, for example cylinder heads, include complex geometric shapes. The production of tooling which is used to cast complex geometric shapes has required a combination of engineering design, pattern making, and casting experimentation, to produce molds which produce acceptable components.

Typically, past methods for producing molds for complex geometries have begun in the laboratory, where clay models of the components are tested and refined. For example, a clay model of cylinder head design is engineered, and then tested and refined in the laboratory by adding and removing material to provide desired air flow characteristics. Thus, the air flow channels through such parts are not simple cylinders, but complex shapes. A "master flow box" is then made from the clay model by filling its flow channels with a compound, such as a liquid plastic or sand and adhesive mix, which hardens in the shape of the flow channels. Thereafter, the clay is removed, leaving a male mold which is placed in a perimeter mold to replicate the flow channels. A "master flow box" is then made of a permanent material, such as a plastic, poured into the perimeter mold. The master flow box is split open and the male molds removed. The master flow box is reassembled and the air flow therethrough is checked, and minor design changes made, as needed.

Drawings are then produced by direct, physical measurement of the master flow box. In turn, the completed drawings are measured at selected intervals to generate data for input into a computer-aided design (CAD) system. The CAD data is used to create additional drawings and to perform further engineering analysis of the characteristics of the particular component. However, the generation of CAD data from drawings produced by direct physical measurement of the master flow box involves a lengthy design process. This problem has been partially overcome with more recent CAD systems which are capable of receiving data input directly from a fine-tipped stylus which is traced over the flow channel contours of the master flow box at predetermined intervals. Drawings are then made from the CAD data with the CAD system, and the overall time required to obtain both drawings and CAD data is reduced. However, with both measurement procedures many nuances and subtleties in the surfaces of the master flow box are lost because the measurements are made at defined intervals between which small but significant variations in the flow channel surfaces have been defined.

After the CAD data is developed, a tape of the CAD data (hereafter, a CAD tape) is converted to a numerical control tape (hereafter, an NC tape) by a specialized, numerically controlled machine (hereafter, NC machine), for use on the NC machine. In the conversion process, the NC machine interpolates the CAD data to produce an NC tape with many times the data of the CAD tape. The data is also modified to expand the flow channel dimensions a small percentage to allow for shrinkage of the molded forms therein during production. Production partings for separation of the mold parts are also defined at this point. The NC machine then reads the NC tape which controls the motion of cutters to produce a "master model" of the mold shape out of metal. The operability of the production partings is then tested by casting male molds with the master model, and changes in the production partings made as needed. Once a suitable master model is obtained, numerous replicas thereof may be made with the NC tape to serve as production tooling.

In the conversion of CAD data to NC data, the interpolation process further smooths out the subtleties and nuances of complex geometric surfaces, causing a loss of these design features in the master model. Although more data could be taken when inputting the CAD data, sufficient data for an NC machine to produce a master model of a complex geometric surface would overwhelm the data handling capabilities of currently available CAD systems. The amount of data sufficient to produce a CAD drawing, and generate CAD surfaces for further engineering design purposes, may be as much as ten times less than that required for the NC tape.

Additional problems have been experienced in practice at this stage in the development of tooling. From a practical standpoint, the specialized NC machine required to provide data conversion from CAD data to NC data is expensive, and therefore is owned by a more limited number of vendors than otherwise are available for production of master models by numerically controlled machining.

Alternatively, a master model may be produced with some accuracy independently of the CAD data, by directly inputting data from the master flow box into an NC tape. NC machines are now also capable of receiving data input directly from a cutter-shaped stylus which is traced over the contours of the master flow box at predetermined intervals to define the cutter path. Using this capability, one option is to make a direct NC tape from the master flow box. Production partings are added, allowance for shrinkage made, and a fairly precise master model made from the NC tape. Another option produces equally precise master models without using either CAD data or making an NC tape, by using an NC duplicating machine. The cutter of an NC duplicating machine mimics the path of a cutter-shaped stylus which is simultaneously traced over the surface of a master flow box. The cutter thereby duplicates the shape directly in metal to produce a master model, without necessitating the creation of an NC tape. However, when these methods are used, a separate CAD data base is generated to produce drawings and conduct further engineering analysis. There is, thus, no formal interrelation between the CAD and NC data bases.

Regardless of the method used to develop CAD data or NC data, all of the methods share additional drawbacks. From a practical standpoint, even major manufacturers typically engage vendors (machine shops having NC machines) to produce the master models from vendor-made NC tapes or with NC duplicating machines. Because several vendors are typically used to produce tooling in production quantities, and each defines different production partings. Variations and inaccuracies in tooling appear from vendor to vendor. In turn, the resulting component variation can affect product performance. For example, where such tooling produces automobile engine parts, variability in the production engines results, effecting fuel economy and emissions performance.

Another, more significant problem is experienced by all methods which use a stylus to trace the surfaces of complex geometries, whether to input CAD data or NC data. Erroneous data is entered when the stylus is passed over a boundary between surfaces which forms a sharp angle, right angle, or other rapid transition between surfaces. For example, when a stylus traces from the surface of a flow channel in a master flow box over an edge to a plane at which the master flow box is separated, erroneous data is produced which defines irregularities at the edge not present in the master flow box. FIG. 2 shows a plot of CAD data so entered at an edge of a flow box, showing this "edge effect". Where this problem occurs in entering NC data with a stylus, an NC machine will cut irregularities into the workpiece which must be corrected by additional hand work.

In summary, the variations and inconsistencies from original component design are introduced into production in a number of ways. Prior art methods of surface measurement, data entry, and data translation result in errors and inconsistencies in the drawings, CAD data and NC data compared to the original design Moreover, these errors, inconsistencies and variations remain uncorrected, as no effective way exists to enter corrections back into the data bases. Similarly, no cost-effective way exists to modify the data bases to enter design improvements arising from further engineering, or from casting experimentation. Rather, the NC data and CAD data must be re-entered to produce drawings and NC tapes for production, allowing opportunities for further error.

Further, there is no reverse engineering capability or method which permits the surfaces of the master model, production tooling, used tooling, or castings produced therewith, to be compared against either the CAD data or NC data for precision during production, or monitoring during use. Direct physical measurement and physical comparison with the master flow box remains necessary. As a result, quality control of tooling production and component production, and monitoring of tooling wear, are tedious and time-consuming. Correction of errors, variations, and tooling repair continues to require welding and hand grinding.

Thus, while improvements have been made in the production of tooling having complex geometric shapes, problems remain which limit the ability of each of the prior art methods to accurately replicate the nuances of the master model in production tooling. In particular, data entry with a stylus is hampered by inaccuracies introduced at the edges of shapes. Accordingly, the need exists for tooling design and production methods which capture all of the features of engineered components, permit the correction of data errors present in CAD and NC data bases, and enable the entry of design improvements into CAD or NC data without requiring complete data re-entry. The need further exists to permit dimensional checks of master models, production tooling, and worn tooling against the CAD data or NC data bases, to eliminate the need for direct physical measurement.

SUMMARY OF THE INVENTION

These needs are satisfied by the present invention in which an improved method for defining complex geometries is applied to transpose geometric surfaces accurately into tooling.

The method of the present invention provides a technique for eliminating the entry of erroneous position data at the edges and boundaries of a tooling master, allowing the entry of accurate position data defining geometric surfaces. The method further provides for the creation and interrelation of accurate design, manufacturing, and control data bases which are used to enhance the speed and accuracy with which tooling having geometric surfaces may be designed and produced. The method of the present invention further has a reverse engineering capability which accommodates design improvements, facilitates correction of manufacturing errors in tooling, and permits monitoring and repair of tooling wear more quickly and easily than known methods.

In accordance with a first aspect of the present invention, the method calls for adding a layer of material to planar surfaces of master flow boxes, master models, or tooling to eliminate the entry of erroneous position data. Erroneous position data is typically entered into a processor means when a stylus is used to trace geometric surfaces and moves over a sharp boundary between intersecting geometric and planar surfaces. The rapid transition at the boundary generates erroneous data regarding the geometric surface and the boundary. The temporary addition of a layer of material of known thickness to the planar surface permits the stylus tracing the geometric surface to proceed along lines which continue across the cross-sectional thickness of the added layer. As a result, accurate position data relating to the geometric surface is entered for the areas adjacent to the boundary. While erroneous position data is entered for the cross-sectional surface of the added layer as the stylus reaches the opposite edge thereof, position data relating to the layer of material is deleted with the processor means. The planar surface is defined by the processor means using a portion of the position data, preferably relative to previously established control points defining reference points, lines, and planes. Thus, the present method thereby provides accurate position data relating to the geometric surface at the boundary.

A number of significant problems are overcome and numerous advantages result from this feature of the invention. The elimination of erroneous position data related to the geometric surfaces obviates the need for time-consuming correction of position data in engineering design data bases, allows accurate drawings to be produced quickly from design data bases, and prevents the translation of erroneous data into tooling by surface machining methods. As well, labor required to modify tooling surfaces machined with erroneous data and conform the surfaces to their intended design is thereby eliminated.

Thus, in summary, the method of the present invention involves the steps of obtaining tooling for a component having at least one geometric surface and at least one substantially planar surface which intersect to form a boundary which is a rapid transition between the surfaces, adding a layer of material to the planar surface, tracing the geometric surface and the cross-sectional thickness of the added layer and inputting position data related to the surface and layer to a processor means, repeating the steps of tracing and inputting to obtain position data for the geometric surface, deleting the position data related to the added layer, and defining the planar surface with a portion of the position data.

In accordance with a further aspect of the present invention, the method may be repeated to develop a plurality of different data bases having accurate position data, to serve engineering, design and manufacturing needs. Further, to obtain flexibility in the use of such data bases, the method of the present invention calls for the definition of a plurality of control points on a master flow box or master model which may be traced and incorporated commonly with all data bases, so that interrelation between the data bases, based on common control points is possible. Thus, because data relating to the geometric surfaces may be entered with greater reliability, it becomes possible to develop and interrelate design, manufacturing, and control data bases in a meaningful way.

It is preferred, therefore, in accordance with the present method, to obtain at the outset, a control data base of position data. By repeatedly tracing the geometric surface in accordance with the present invention, accurate position data may be input defining a plurality of control points on the geometric surface. Preferably, approximately 100 control points are defined, including surface areas of difficult or complex geometry, areas of engineering or manufacturing significance, and areas of expected wear during use. Other control or reference points outside the geometric surface may also be included in the control data base to locate the control points relative to reference points, lines and planes.

A design data base is further obtained in accordance with the present method for engineering and design purposes. A density of design points sufficient to automatically define the geometric surface for computer-aided design and drafting is defined, and thereafter the surface of the tooling is traced to input position data for the desired density of design points. Preferably, the geometric surfaces are traced along lines in a series of parallel planes disposed in a first direction, and then along lines in a series of parallel planes in a second direction, preferably at 90 degrees (°) to the first direction. It is also preferred that the lines for which position data is obtained also trace over the control points. The design data base of position data enables computer-aided design (CAD) of the geometric surface, and permits the production of accurate drawings in a short time.

Similarly, a production data base of position data relating to the tooling surfaces can be developed in accordance with the present invention. A density of production points is defined which is sufficient to automatically define a geometric surface for a numerically controlled surface machining. The geometric surface of the tooling is traced, and position data for production points sufficient for surface machining are input to produce a production data base. In tracing the geometric surface to produce the production data base, the method of the present invention preferably calls for tracing lines which also include the control points, so that the respective data bases can be interrelated. The production data base is preferably loaded on an NC tape for use in numerically controlled surface machining.

Several advantages result from overcoming the problems present in the prior art. The method of the present invention allows a tooling master to be traced and accurate position data to be entered so that tooling may be surface machined accurately without requiring additional labor to correct "edge effects" present in prior art methods. The tooling produced may further be checked for accuracy by automatically tracing its surfaces along the control points, rather than physically measuring and comparing the tooling by hand. Quality control back to the original design values is thereby possible, and tighter tolerances may be maintained. Similarly, when the tooling is in use in production, wear may be monitored periodically by retracing the geometric surface of the tooling in accordance with the present invention, and comparing the position data at the control points to the original values. Once the wear causes the production tooling to be out of tolerance, it can be repaired, for example, by adding weldment, and the affected area remachined to restore the geometric surface in accordance with the original production data base.

Further, the method of the present invention permits the design data base to be used for further engineering analysis, and design modifications which may result can be entered into the design data base without laboriously requiring redrafting of drawings and/or physical measurement of a model. As well, the control data base can be modified to reflect the changed design. The design modification may be reintroduced into the production data base by retracing tooling incorporating the design modification.

BRIEF DESCRIPTION OF THE DRAWINGS

FIG. 4 is a perspective view of a B-spline drawing prepared from a design data base obtained in accordance with the present invention.

DETAILED DESCRIPTION OF THE PREFERRED EMBODIMENTS

Figure 3:
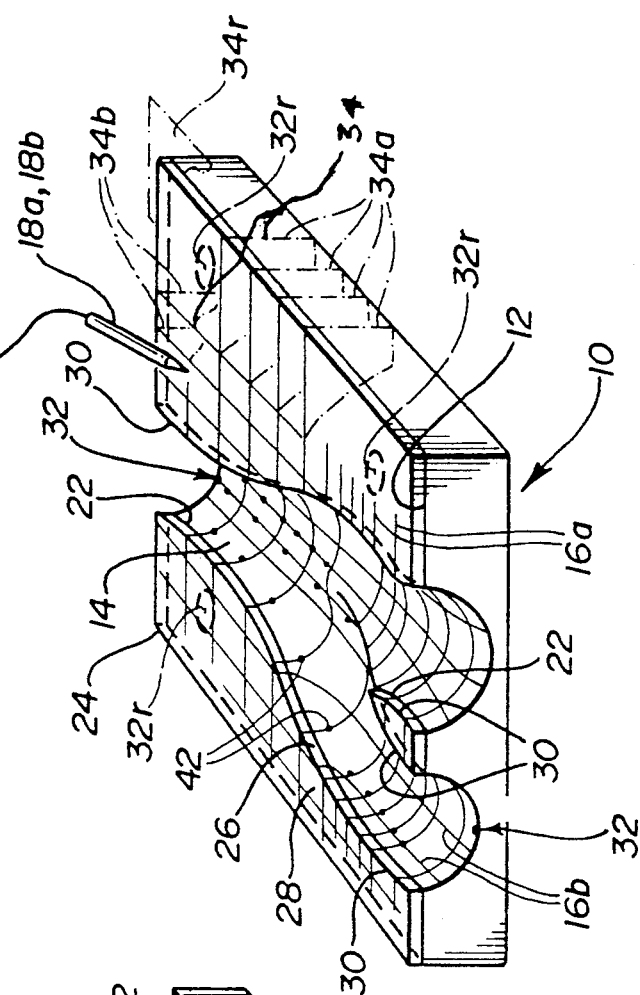
FIG. 3 is a perspective view of a tooling master including a layer of added material and a pattern of lines traced on the surfaces thereof in accordance with the method of the present invention.
Figure 1:
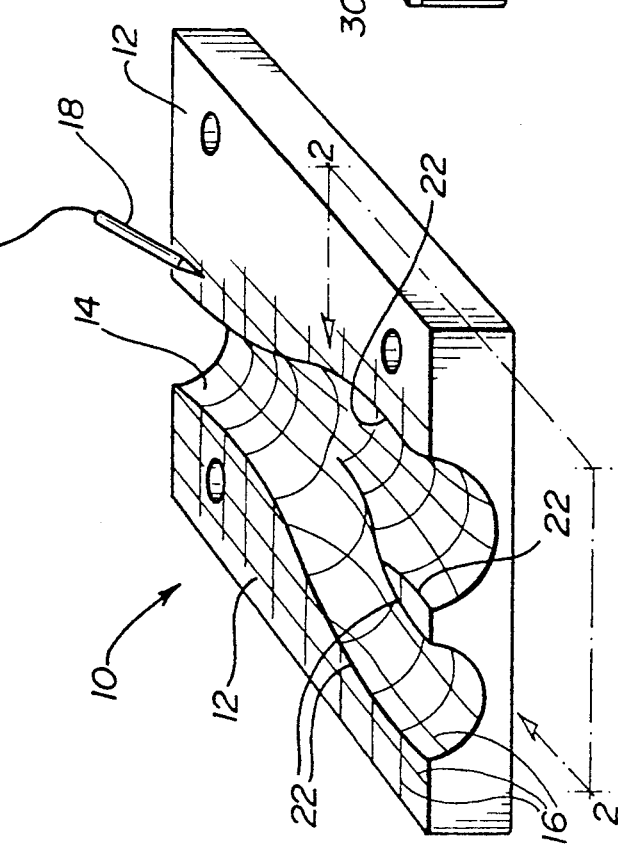
FIG. 1 is a perspective view of a representative tooling master showing lines traced on the surfaces thereof in accordance with the prior art.

Referring to FIGS. 1 and 3, tooling 10 having planar surface 12 and geometric surface 14 is shown with representative trace lines 16, traced with a stylus 18, indicated thereon. Position data for points along trace lines 16 is inputted with a stylus 18 into processor means 20 to produce a design data base. FIG. 1 reflects prior art methods for obtaining position data.

Figure 2:
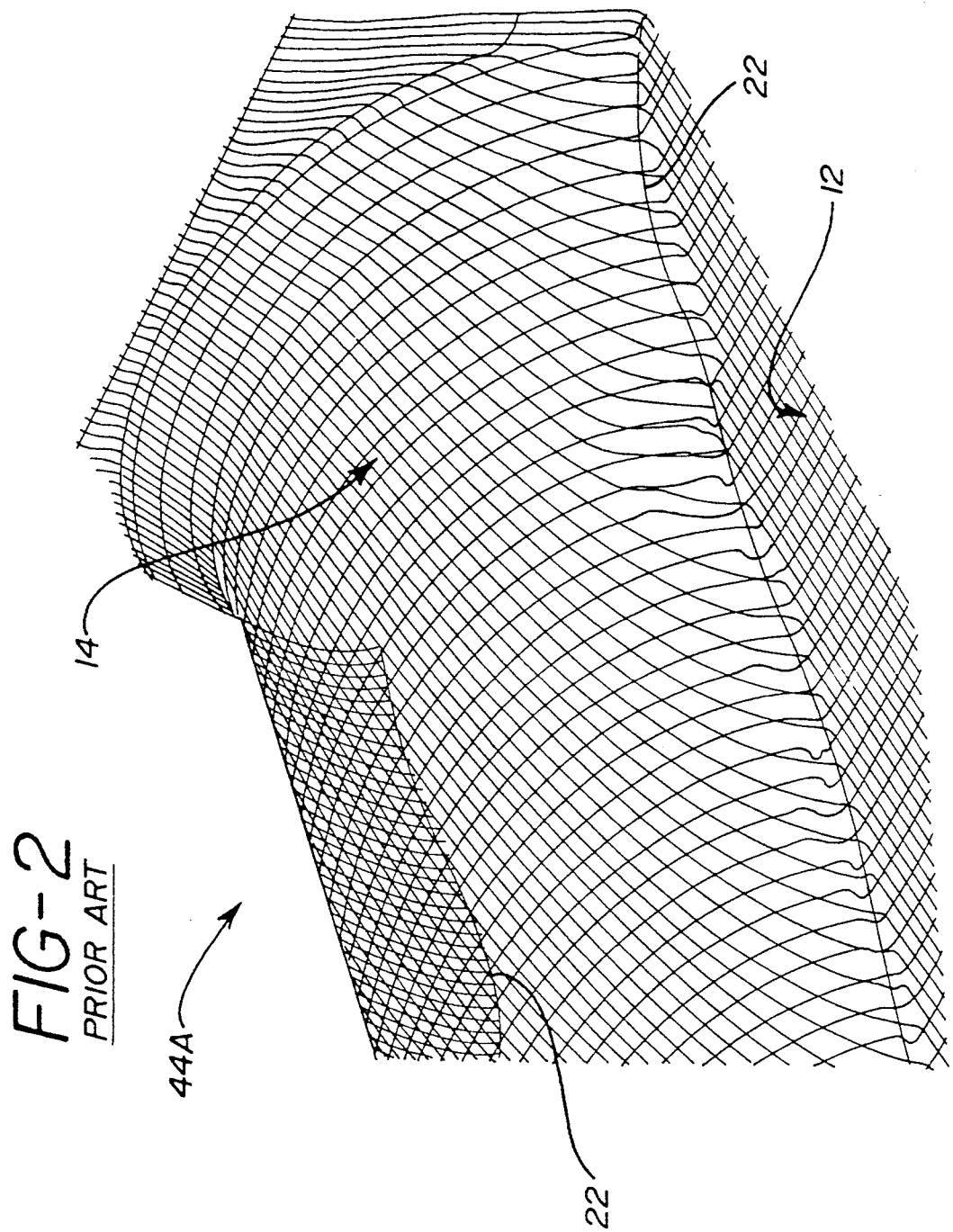
FIG. 2 is a perspective view of a representative inverted B-spline drawing prepared from a design data base for area 2—2 in FIG. 1 area 2—2 in accordance with the prior art, demonstrating the effect of erroneous data entered at the boundaries between geometric and planar surfaces.

FIG. 2 is an inverted "B-spline" computer-aided design (CAD) drawing 44A of a representative portion of the tooling 10 of FIG. 1 indicated at line 2—2 therein, showing the planar and geometric surfaces 12, 14 defined by a design data base obtained by prior art tracing methods. As may be seen in FIG. 2, erroneous position data was entered into the processor means 20 by the stylus 18 as it moved over the sharp boundaries 22. It has been found that rapid transitions at boundaries 22 between intersecting surfaces cause styluses 18 to enter erroneous position data. In turn, the erroneous position data produce irregularities in the CAD drawings 44A, as shown in FIG. 2.

Reference is now made to FIG. 3 which incorporates certain additional elements and features in accordance with the present invention. The method of the present invention provides for the step of first, obtaining tooling 10 for a component having certain features. Tooling 10 has at least one geometric surface 14 and at least one substantially planar surface 12 which intersect along a boundary 22 where there is a rapid transition between the surfaces. The method next requires adding a layer 24 of material of known thickness to the planar surface 12. Adding a layer 24 of material to the planar surface 12 of the tooling 10 causes the stylus 18 to enter accurate position data defining the geometric surface 14 near the boundary 22. The step of tracing the geometric surface 14 and the added layer 24 is then performed simultaneously with the step of inputting position data related to the surface 14 and layer 24 to the processor means 20. The steps of tracing and inputting are repeated at spaced intervals to obtain accurate position data defining the geometric surface 14. The stylus 18 produces erroneous position data for layer 24, specifically its cross-sectional surface area 26 and planar surface 28 near its boundary 30. However, the method next comprises the steps of deleting with the processor means 20 the position data related to the added layer 24, which has a known thickness, and defining the planar surface 12 with the processor means 20 using a portion of the position data. The present method thereby provides accurate position data relating to the geometric surface 14 and planar surface 12 at the boundary 22.

The material of layer 24 is preferably a thermally stable material sheet material, for example a lightweight plastic, such as generally commercially available urethane or epoxy, or Wren Board ®, a commercially available plastic board available from Wren Manufacturing of Livonia, Mich. As a further example, the material of layer 24 may be made of a stable wood, such as Honduras mahogany. Metal sheets may also be used, but are not preferred. The layer 24 is attached to a surface with spots of adhesive. At boundary 22, the cross sectional thickness of the layer 24 is trimmed to match the contour of the intersecting geometric surface 14.

Preferably, the method further includes the step of initially defining reference points 32r, reference or datum lines, and reference planes 34r on the tooling. The step of initially defining is performed by initially inputting position data for at least one control point 32 to provide at least one point 32r of reference for the position data related to surfaces 12, 14. Further in this regard, it is preferred to input position data for a plurality of control points 32 to establish at least one reference plane 34r, representatively shown in FIG. 3. Thus, a three-dimensional frame of reference results.

It is further preferred to initially define at least three control points 32 to identify the position of planar surface 12 relative to the frame of reference. Planar surface 12 is typically a parting surface including at least one parting line, such as at boundary 22, for tooling 10.

The step of obtaining tooling may include obtaining a master flow box, also referred to herein as a tooling master 10a, or a master model 10b which is a replica of the tooling master 10a, typically in metal. The step of obtaining tooling 10 may also include obtaining new or used tooling 10c or 10d, produced by any method, which has boundaries 22 or rapid transitions between surfaces of the type herein described. Such boundaries 22 or rapid transitions predominately comprise sharp, convex edges.

Where no frame of reference is defined initially, the step of tracing preferably includes tracing at least one trace line 16 to obtain position data for at least one control point 32 on the planar or geometric surfaces 12, 14 which will also serve as a reference point 32r. Once a plurality of such reference points 32r are identified, a frame of reference is established. It is preferred that later performance of the steps of tracing and retracing include obtaining position data including the reference points 32r.

As may be further understood by reference to FIG. 3, the step of tracing in accordance with the present method is preferably performed along a trace line 16 which is substantially disposed in a plane 34. For simplicity, it is preferred to repeatedly perform the step of tracing the surface 12, 14 along a series of spaced trace lines 16 which are disposed in a series of planes 34 spaced apart by a defined relationship. The planes 34 in FIG. 3 are cut away for clarity. The defined spatial relationship between trace lines 16 and planes 34 is preferably varied depending on the complexity of the geometric surface 14 involved and the intended use of the position data. Thus, for computer-aided design purposes, where relatively unremarkable surfaces are encountered, in accordance with the present invention the defined spacing between trace lines 16 is approximately 0.100 inches apart. Where the contours of the geometric surface change rapidly, the defined spacing is reduced to 0.040 inches in separation.

As may also be understood by reference to FIG. 3, the step of tracing may also be performed along a first and a second series of trace lines 16a, 16b which are disposed in first and second series of substantially parallel planes 34a, 34b where the second series of planes 34b are disposed at an angle to the first series of planes 34a.

The method of the present invention may be used to develop position data for geometric and planar surfaces 14, 12 which may be of varying detail, as required to perform various tasks. Thus, in accordance with a further aspect of the present invention, the method may be repeated to develop a plurality of different data bases having accurate position data, to serve engineering, design and manufacturing needs. Further, to obtain flexibility in the use of such data bases, the method of the present invention calls for the definition of a plurality of control points 32 on the tooling master 10a or master model 10b, which may be traced and incorporated commonly into all data bases, so that interrelation between the data bases, based on common control points 32, is possible. Thus, because data relating to the geometric and planar surfaces 14, 12 may be entered with greater reliability in accordance with the present invention, it becomes possible to develop and interrelate design, manufacturing, and control data bases in a meaningful way, and make greater use of existing technology.

Figure 5:
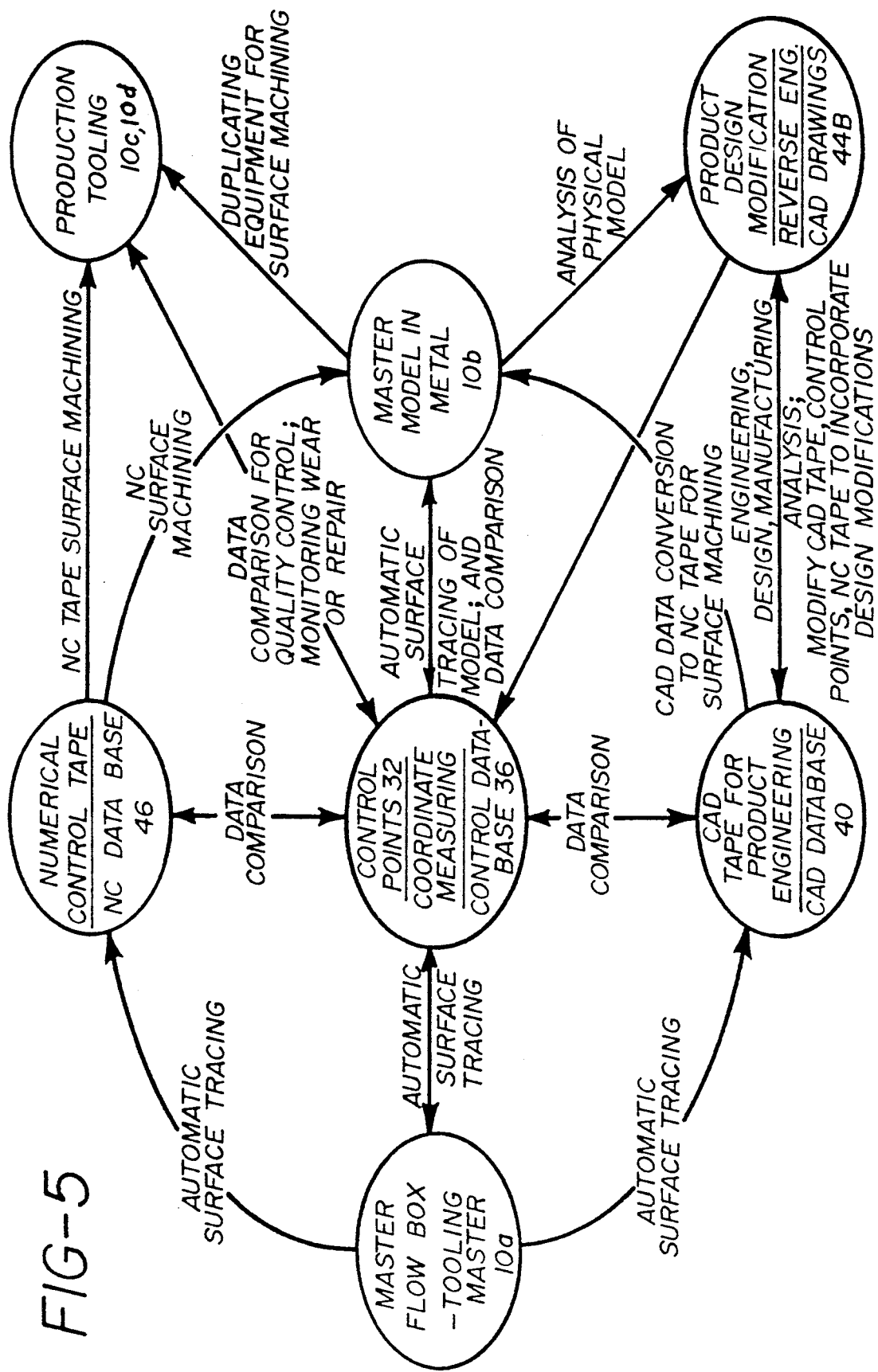
FIG. 5 is a schematic block diagram of the method of the present invention.

Referring to FIG. 5, a further aspect of the present invention encompasses an overall method for designing, manufacturing, and controlling tooling development and production. This overall method includes the development of a plurality of interrelated databases. As shown in FIG. 5, the method of the present invention is used to directly transpose complex geometric surfaces into data bases, and vice versa. As shown, tooling master 10a is preferably traced by automatic surface tracing methods to separately produce a control data base 36, a CAD data base 40, and an NC data base 46. The latter two data bases 40, 46, preferably include position data for the control points 32, thereby enabling data comparison for accuracy. The CAD data base 40 is preferably used for producing tooling design drawings 44B and for further design analysis. The NC data base is preferably used to produce a master model 10b in metal, such as aluminum or magnesium, by numerically controlled machining. Once the control points 32 on master model 10b are checked against the control data base 36 and found to be within production tolerances, the NC data base 46 is deemed acceptable for further use to produce production tooling 10c. The production tooling 10c may be checked against the control data base 36 as a quality control measure. An alternate path for producing the master model 10b by translation of the CAD data base 40, and an alternate path for producing production tooling using duplicating equipment on master model 10b are shown, but not preferred.

Also illustrated in FIG. 5, is the capability of the overall method of the present invention to reincorporate design modifications from computer analysis or physical testing, back into the control, CAD and NC data bases 36, 40, 46 using the method of the present invention. This same capability can also be used to reverse-engineer other components. In like fashion, wear on production tooling 10c can be monitored by comparison to the control data base 36, and repairs may be made using the NC data base, as required.

This overall method will now be explained in greater detail.

It is preferred, therefore, in accordance with the present method, to obtain at the outset, a control data base 36 of position data by defining a plurality of control points 32 on the geometric and planar surfaces 14, 12. Approximately 100 control points 32 are preferred, including control points 32 on surface areas of difficult or complex geometry, areas of engineering or manufacturing significance, and areas of expected wear during use. Other control or reference points outside the geometric surface 14 may also be defined and included in the control data base 36 to locate the control points 32 relative to reference points, lines and planes. Once the control points 32 are defined, the steps of tracing and completing include tracing the geometric surface 14 and planar surface 12 along a plurality of trace lines 16 which include the locations of the control points 32. The step of inputting position data includes inputting data defining at least the control points 32 defined on the geometric surface 14. A control data base 36 of position data related to a plurality of control points 32 is thereby produced.

A fine-tipped stylus 18a is preferred for tracing the geometric surface 14 for purposes of developing the control data base 36. Such styluses 18a are well-known in the art, and are capable of inputting not only x, y, and z position data but are also capable of generating i, j, k vector position data which is useful in identifying the vector direction of a point relative to a reference point. The vector position data is significant in identifying the direction of displacement of surfaces relative to reference points, lines or planes. A fine tipped stylus 18a is, by way of example and not limitation, a model E-11 stylus available from D.E.A., Livonia, Mich. As is known in the art, various machines exist which automatically trace surfaces of a geometric surface with a fine tipped stylus 18a.

The control data base 36 has an immediate value from a production and tooling use standpoint. That is, the control points 32 may be used as a quality control check for tooling 10b, 10c produced in accordance with the present invention, or may also be used to monitor tooling wear during use. See FIG. 5. Thus, the method further includes the steps of defining a tooling tolerance, which may be a production tooling tolerance or a tooling use tolerance. Considering first the use of a production tooling tolerance, the method of the present invention includes obtaining tooling 10 having geometric surface 14 and planar surface 12 copied from a tooling master 10a, and performing the steps of tracing and inputting position data for control points 32 on the tooling 10, and repeating the tracing and inputting to obtain all control points 32 desired. The next step requires automatically comparing the position data relating to the control points 32 from the tooling master 10a and the production tooling 10c, and identifying control points 32 at which the position data varies from that of the tooling master 10a by more than the production tooling tolerance. The final step comprises modifying the geometric surface 14 of the tooling 10c, as necessary, so that the position data related to the control points 32 on the tooling master 10a and production tooling 10c are substantially within the production tooling tolerance. In this way, quality control of production tooling 10c may be obtained at the outset to very tight tolerances. The manner of modifying the geometric surface 14 of the production tooling is further discussed below.

A "mini-check" of selected control points 32 may also be performed as a first level quality control measure. To perform a mini-check, the step of comparing the position data relating to the control points 32 from the tooling master 10a and the production tooling 10c, compares specific control points 32 obtained as reference points 32r or otherwise, such as the center line of inlet and outlet ports, bolt holes and other openings. This mini-check provides a rough, initial check of overall dimensional consistency of the tooling 10c.

As may be understood, among the uses of tooling 10 developed in accordance with the present method, is the production of cores, particularly sand cores, which may be assembled for use in casting various components. Repeated use of the tooling 10c results in wear due, for example, to the sand blown into the tooling for molding sand cores.

Accordingly, a similar method may be used to monitor the wear on used tooling 10d by automatically comparing the position data related to control points 32 from a tooling master 10a to the position data for control points 32 on used tooling 10d. In this regard, the method calls for the step of identifying control points 32 at which position data relating to the tooling master 10a and the used tooling 10d vary more than the tooling use tolerance. Finally, the step of modifying the geometric surface 14 of the used tooling 10d, as necessary, may be carried out such that position data related to the control points 32 on the tooling master 10a and the used tooling 10d are substantially within the tooling use tolerance. In short, the step of modifying may include welding additional metal onto worn surfaces 14, 12 of the used tooling 10d, and remachining those surfaces 14,12 using a numerically controlled machine.

As shown in FIG. 5, a design data base 40 may be further obtained in accordance with the present method, for engineering and design purposes. In this regard, the method further includes the step of defining a density of design points 42 sufficient to automatically define the geometric surface 14 for computer-aided design and drafting. Thereafter, the tracing of the surfaces 14, 12 of the tooling and inputting of position data is repeatedly performed to obtain the desired density of design points 42. A design data base 40 is thereby developed relating to the design points 42 required for computer-aided design of the geometric surface 14. Preferably, the geometric surface 14 is traced along trace lines 16a in a series of parallel planes 34a disposed in a first direction, and then along a series of lines 16b in parallel planes 34b oriented in a second direction, preferably at 90° to the first direction. The method further includes the step of producing a CAD drawing 44B of the geometric surface 14 with the processor means 20 using the design data base 40.

FIG. 4 is a CAD drawing 44B developed in accordance with the method of the present invention showing the accurate position data relating to the boundaries 22 between surfaces, and demonstrating the variation and the spacing between generally parallel lines where the geometric surface 14 has rapid slope changes or transitions in topography. The design data base 40 enables computer-aided design of the geometric surface 14, and permits the production of accurate drawings in a short time. Further engineering analysis may be performed, as well, using the CAD data base 40.

Preferably, the trace lines 16 for which position data is obtained for the design data base 40 also trace over the control points 32 of the control data base 36. Where further engineering analysis, or manufacturing analysis provides improvements in the surfaces 12, 14, the areas of design modification can be defined, and position data in the design data base 40 replaced by the processor means 20. Where, for example, improvements are made by computer analysis, the position data can be computer generated, and replaced directly by the processor means 20. Where improvements are made in physical models, the areas of improvement may be retraced, and then entered automatically by the processor means 20 into the design data base 40. In either case, where the design data base has included the control points 32 in the area of design modification, the control data base 36 can also automatically be changed by the processor means 20 to include the design improvements.

Thus, the method of the present invention may further include the steps of modifying the design of the geometric or planar surfaces 14, 12 copied in one or more areas of design modification, defining those areas of design modification, and automatically replacing the position data relating to control points 32 with the processor means 20 into the control data base 40. In this way, design improvements may also be effectively entered into the control data base 36, and incorporated into the design of the tooling 10 with ease. Further, in this regard, the method of the present invention thereby may be used to accurately modify design and control data bases 40 and 36 to incorporate design changes and improvements which arise late in the design and testing stage of tooling development.

Referring again to FIG. 5, production data base 46 of position data relating to the geometric and planar tooling surfaces 14, 12 can also be developed in accordance with the method of the present invention. To produce the production data base 46, the method further includes the step of defining a density of production points 48 sufficient to automatically define a geometric surface 14 (or planar surface 12) for numerically controlled machining. The steps of tracing and repeating the step of tracing include tracing along a plurality of trace lines 16 to produce position data for sufficient production points 48 to permit surface machining the geometric surface 14 (or planar surface 12) in a workpiece and produce production tooling 10c. Again, the position data is input into a processor means 20 by a stylus 18 to produce the production data base 46 which may then be loaded onto an NC data tape to operate a numerically controlled machine to produce the surfaces.

Once the position data defining the geometric and planar surfaces is inputted into the processor means 20 to define a production data base 46, the production data base 46 is expanded slightly by the processor means 20, typically 2% larger, so that the production tooling 10c produced in accordance with the NC tape is slightly oversized. Such expansion of the production data base 46 is desirable to account for shrinkage of components molded with the tooling 10c.

Preferably, the trace lines 16 traced on the surfaces 14, 12 to produce production data base 46 are at a spacing of 0.010 inches in all areas. The steps of tracing and retracing also preferably call for tracing lines which also include the control points 32, so that the respective production data base 46 and control data base 36 can be interrelated.

Several advantages result from this interrelation. The method permits accurate position data to be entered so that none of the edge effects present in the prior art methods are translated into machined surfaces which must be corrected by hand. Quality control back to the original design is possible by reference to control points 32 of the control data base 36. Tighter production tolerances may be maintained, as outlined above. In the event that production tooling 10c is out of tolerance, the surface 14 or 12 may be remachined with the NC tape, and weldment added, where necessary. See FIG. 5.

Preferably the stylus 18b used for tracing tooling to produce production data base 46 incorporates a head which simulates the cutting blade of a numerically controlled machine. Therefore, the position data which defines the tool path for the numerically controlled machine is established with position data which need not be further translated by the processor means 20. Further, in this regard, the position data necessary for NC machining requires only the capture of x, y, and z coordinate data. Thus the i,j, k vector data which is provided by fine-tipped styluses 18a and used in the control data base 36 and design data base 40 is not necessary for the production data base 46. In this regard, when quality control and monitoring of wear is conducted on tooling 10c, 10d, the surfaces 12, 14 are preferably traced with a fine-tipped stylus 18a to provide position data compatible with that in the control data base 40. Styluses 18b which simulate cutting tool paths are, for example, simply made by attaching a round steel ball substantially the same size as the cutter of a cutting tool to a rod. The rod is threaded or has other means for attachment to a machine of the type known in the art for automatic tracing, such as, for example, a duplicating machine. The length of the stylus 18b is sized as required to accommodate the surface to be traced. The stylus 18b is then attached to an arm or element of the machine used for automatic tracing, and the motion of the arm or element is measured relative to an x, y, z coordinate system as the stylus 18b is traced over a surface to obtain position data.

The method of producing the production data base 46 is also capable of incorporating design modifications into the production data base 46, as illustrated in FIG. 5. That is, once tooling 10a, 10b, 10c having geometric or planar surfaces 14, 12 is produced, design modifications may be defined in one or more areas of the geometric surface 14, for example, for improved performance, or in the planar surface 12, for example, for improved cooperation between parting surfaces. To standardize the entry of position data for modification and improvements in design, preferably several areas or zones are defined on the tooling 10a, 10b, 10c as a matter of convention. Regardless, the method of incorporating modifications includes performing the steps of tracing and repeating on the tooling 10a, 10b, 10c in one or more areas of design modification, and inputting the position data for the production points 48 relating to those areas into the processor means 20, and automatically replacing the position data relating to the production points 48 with the processor means 20 in the areas of design modification, thereby modifying the production data base 46 to incorporate the design modifications.

In a further aspect of the present invention indicated in FIG. 5, the method may be applied to reverse-engineer tooling from a component having at least one geometric surface 14. The shape of the component surfaces could be for example, as illustrated by the CAD drawing 44B in FIG. 4. The steps of tracing the geometric surface 14, and inputting component position data may be performed as before for tooling 10. Repeating the steps of tracing and inputting are as performed to develop component position data defining at least a portion of the geometric surface 14. Thereafter, the method calls for defining at least a one planar surface 12 intersecting the geometric surface 14 using the processor means 20 to perform such definition. The planar surface 12 is used to define at least one parting line for tooling 10 to produce the component. The method next calls for producing at least a portion of the geometric surface 14 in tooling 10, by using a portion of the component position data to surface machine a workpiece. The tooling 10 therefore includes at least a portion of the geometric surface 14 and at least one planar surface 12 intersecting along a boundary 22 providing a rapid transition between the geometric surface 14 and planar surface 12. The method of the present invention further includes the steps of verifying the accuracy of the tooling 10, by adding a layer of material 24 to the planar surface 12; tracing the geometric surface 14 and layer 24 in cross-section and inputting position data related to the surface 26 of the layer 24 into the processor means 20; repeating the steps of tracing and inputting along a series of trace lines 16; deleting the position data related to the portion of the layer 24 in cross-section; and defining the planar surface 12 with at least a portion of the position data. The method thereby produces position data defining the geometric surface 14 and the planar surface 12, after which the final step comprises comparing at least a portion of the component position data with the position data from the tooling 10 to verify the accuracy of the tooling 10.

The improved accuracy available in accordance with the present invention has still other advantages. It becomes possible now for control of parting lines to be exercised and accurate definition of surfaces to be established at an early stage in tooling development programs. A single parting line may be defined, and an NC tool path developed which is commonly used by all tooling manufacturers who may be engaged to produce tooling on their equipment. Moreover, the present method eliminates the need to convert CAD data into NC data, and thereby opens up the scope of tooling vendors and equipment who may be engaged to machine tooling. The present invention has the further benefit of allowing past designs to be utilized by reverse-engineering procedures. In like fashion, competitor's components can be reverse-engineered, and entered into design data bases 40 for engineering analysis.

The method of the present invention whereby an additional layer 24 is added to one surface at a boundary between intersecting surfaces to produce accurate position data, may also be applied in like fashion to produce accurate position data for intersecting surfaces where one surface is not planar. The material of layer 24 in such cases may be an elastomeric material, sufficiently flexible to conform to one surface, while sufficiently stiff to permit tracing by a stylus 18. However, the preferred embodiment described above includes its application to boundaries between planar surface 12 and geometric surface 14 present in tooling 10, particularly tooling 10, which is used to produce components having a complex geometric surface 14.

While certain representative embodiments and details have been shown for purposes of illustrating the invention, it will be apparent to those skilled in the art the various changes in the method disclosed herein may be made herein without departing from the scope of the invention, which is defined in the appended claims.

What is claimed is:

1. A method for transposing geometric surfaces into tooling for production of a component, said method comprising the steps of:
    obtaining a tooling master for a component having at least one geometric surface and at least one substantially planar surface, at least a portion of said at least one geometric surface and at least a portion of said at least one substantially planar surface intersecting along a boundary comprising a rapid transition between said geometric and planar surfaces;
    adding a layer of material to said at least one planar surface, and aligning at least a portion of said layer of material in cross-section with at least a portion of said geometric surface substantially adjacent to said boundary;
    tracing said geometric surface and said portion of said layer of material in cross-section along a line, and inputting position data related to said surface and layer to a processor means;
    repeating said steps of tracing and inputting along a series of lines, whereby position data defining at least a portion of said geometric surface and at least a portion of said layer in cross-section is input to said processor means;
    deleting said position data related to said portion of said layer in cross-section; and
    defining said planar surface with at least a portion of said position data;
    whereby position data defining said geometric shape and said planar surface are entered into said processor means.

2. The method of claim 1 wherein:

said step of obtaining obtains tooling which is one of at least two tooling molds separable along at least one parting line; and said planar surface comprises at least one parting surface including at least one parting line.

3. The method of claim 1 wherein said step of obtaining comprises obtaining a tooling master wherein said boundary comprises a convex edge.

4. The method of claim 1 wherein:

said step of inputting position data comprises inputting the position of a plurality of points along said line to define said line in three dimensions; and said step of repeating comprises inputting position data defining at least a portion of said geometric surface in three dimensions.

5. The method of claim 1 wherein said steps of tracing and repeating include tracing along at least one line including the location of at least one control point on said tooling master to serve as a reference point.

6. The method of claim 1 wherein:

said step of tracing is performed along a line substantially disposed in a plane; and said step of repeating is performed along a series of lines disposed in a series of respective planes interrelated by a defined relationship.

7. The method of claim 6 wherein said step of repeating comprises:

tracing along a first series of lines disposed in a first series of substantially parallel planes separated by defined intervals; and tracing along a second series of lines disposed in a second series of substantially parallel planes separated by defined intervals and disposed at an angle to said first series of planes.

8. The method of claim 7 further comprising the step of varying the defined interval separating said planes in said first and second series of reference planes depending on the surface features of said geometric surface being traced.

9. The method of claim 8 wherein said step of varying said step of tracing is performed in reference planes separated at defined intervals in the range from approximately 10/1000 inches to approximately 100/1000 inches in separation.

10. The method of claim 1 wherein said step of adding a layer of material comprises adding a layer having a thickness at least approximately 100/1000 inches.

11. The method of claim 1 wherein said step of tracing includes first tracing at least a portion of said planar surface and inputting position data related thereto into said processor means.

12. The method of claim 1 wherein:

said method further includes the step of defining a plurality of control points on said geometric surface;

said steps of tracing and repeating include tracing said geometric surface along a plurality of lines which include the locations of said plurality of control points; and said step of inputting position data comprises inputting data defining at least said control points on said geometric surface;

whereby a control data base of position data related to said plurality of control points is produced.

13. The method of claim 12 wherein said step of tracing includes at least one point at which high wear is expected.

14. The method of claim 12 further including the steps of:

defining a dimensional tooling tolerance for said tooling;

obtaining tooling having geometric surfaces copied from said tooling master;

performing said steps of tracing and repeating on said tooling;

inputting position data for said control points from said tooling into said processor means;

automatically comparing said position data relating to said control points from said tooling master and said tooling, respectively;

identifying control points at which said position data relating to said tooling master and said tooling vary more than said dimensional tooling tolerance; and modifying the geometric surface of said tooling, as necessary, such that position data related to said control points on said tooling and are substantially within said dimensional tooling tolerance of said tooling master.

15. The method of claim 1 wherein:

said method further includes the step of defining a density of design points sufficient to automatically define said geometric surface for computer-aided design; and said step of repeating said step of tracing includes tracing along a plurality of lines to produce position data for said design points, and inputting said position data to said processor means;

whereby a design data base relating to said design points for computer-aided design of said geometric surface is produced.

16. The method of claim 15 further comprising the step of producing a drawing of said geometric surface with said processor means using said design data base.

17. The method of claim 15 wherein:

said method further comprises the step of defining a plurality of control points on said geometric surface;

said steps of tracing and repeating said steps of tracing include tracing said geometric surface along a plurality of lines which include the locations of said plurality of control points;

said step of inputting position data further comprises inputting position data defining at least said control points on said geometric surface;

whereby said design data base further includes position data related to said plurality of control points.

18. The method of claim 17 further including the steps of:

modifying the design of said geometric surfaces copied from said tooling master in one or more areas of design modification;

defining said one or more areas of design modification;

automatically replacing said position data relating to said design points in said one or more areas into said design data base;

whereby said design data base is modified to include position data relating to design modifications in said one or more areas of said geometric surface.

19. The method of claim 18 further comprising, after the step of defining. the step of retracing and inputting position data for design points from tooling having one or more areas of design modification.

20. The method of claim 1 wherein:

said method further includes the step of defining a density of production points sufficient to automatically define said geometric surface for numerically controlled machining; and said step of repeating said step of tracing includes tracing along a plurality of lines to produce position data for said production points sufficient for surface machining said geometric surface in a workpiece to produce production tooling, and inputting said position data for said production points to said processor means;

whereby a production data base relating to position data for said productions points is produced by which numerically controlled machining of a workpiece using said production data base produces said geometric surface.

21. The method of claim 20 wherein:

said method further comprises the step of defining a plurality of control points on said geometric surface;

said steps of tracing and repeating include tracing said geometric surface along a plurality of lines which further include the locations of said plurality of control points;

said step of inputting position data further comprises inputting data defining at least said control points on said geometric surface;

whereby said production data base further includes position data related to said plurality of control points.

22. The method of claim 21 further including the steps of:

obtaining tooling having geometric surfaces copied from said tooling master;

performing said steps of tracing and repeating on said tooling;

inputting position data for said control points from said tooling;

automatically comparing said position data relating to said control points from said tooling master and said tooling;

identifying control points at which said position data relating to said tooling master and said tooling vary;

modifying the geometric surface of said tooling at least in part by surface machining, such that position data related to said control points for said tooling master and said tooling are substantially similar.

23. The method of claim 21 further including the steps of:

obtaining tooling having geometric surfaces copied from said tooling master;

incorporating design modifications in one or more areas of said geometric surfaces on said tooling;

defining said one or more areas of design modification with said control points on said tooling;

performing said steps of tracing and repeating on said tooling in said one or more areas;

inputting position data for production points in said one or more areas from said master model tooling;

automatically replacing said position data relating to said production points in said one or more areas into said production data base from said tooling;

whereby the production data base is modified to include position data relating to design modifications in said one or more areas of said geometric surface.

24. The method of claim 1 further comprising the step of producing at least a portion of said geometric surface in tooling by using at least a portion of said position data for surface machining a workpiece.

25. A method for transposing geometric surfaces into tooling for production of a component, said method comprising the steps of:

obtaining tooling for a component having at least one geometric surface and an intersecting second surface, at least a portion of said at least one geometric surface and at least a portion of said second surface intersecting along a boundary comprising a rapid transition between said geometric and second surfaces;

defining at least one reference point on said tooling including at least one reference point on said second surface, and inputting position data relating to said reference point into a processor means;

adding a layer of material to said at least a portion of said second surface, and aligning at least a portion of said layer of material in cross-section with at least a portion of said geometric surface substantially adjacent to said boundary;

tracing said geometric surface and said portion of said layer of material in cross-section along a line, and inputting position data related to said surface and layer to a processor means;

repeating said steps of tracing and inputting along a series of lines, whereby position data defining at least a portion of said geometric surface and at least a portion of said layer in cross-section is input to said processor means;

deleting said position data related to said portion of said layer in cross-section; and defining said second surface with at least a portion of said position data;

whereby position data defining said geometric surface and said second surface are entered into said processor means.

26. A method as recited in claim 25 further comprising:

adding a layer of material to said at least a portion of said geometric surface, and aligning at least a portion of said layer of material in cross-section with at least a portion of said second surface substantially adjacent to said boundary;

tracing said second surface and said portion of said layer of material in cross-section along a line, and inputting position data related to said second surface and layer to a processor means;

repeating said steps of tracing and inputting along a series of lines, whereby position data defining at least a portion of said second surface and at least a portion of said layer in cross-section is input to said processor means; and deleting said position data related to said portion of said layer in cross-section;

whereby position data defining said geometric surface and said second surface are entered into said processor means.

27. A method for transposing complex geometries into tooling for production of a component, said method comprising the steps of:

obtaining a master component having at least one geometric surface;

tracing said at least one geometric surface along a line, and inputting component position data related to said surface and layer to a processor means;

repeating said steps of tracing and inputting along a series of lines. whereby component position data defining at least a portion of said geometric surface is input into said processor means;

defining at least one planar surface intersecting said geometric surface with said processor means, said planar surface defining at least one parting line;

producing at least a portion of the geometric surface of said master component in tooling by using at least a portion of said component position data for surface machining a workpiece to produce tooling, said tooling including at least a portion of said geometric surface and at least a portion of said at least one planar surface intersecting along a boundary comprising a rapid transition between said geometric and planar surfaces;

verifying the accuracy of said tooling, said step of verifying comprising the steps of:

adding a layer of material to said at least one planar surface, and aligning at least a portion of said layer of material in cross-section with at least a portion of said geometric surface substantially adjacent to said boundary;

tracing said geometric surface and said portion of said layer of material in cross-section along a line, and inputting position data related to said surface and layer to a processor means;

repeating said steps of tracing and inputting along a series of lines, whereby position data defining at least a portion of said geometric surface and at least a portion of said layer in cross-section, is input to said processor means;

deleting said position data related to said portion of said layer in cross-section; and defining said planar surface with at least a portion of said position data;

whereby position data defining said geometric surface and said planar surface are entered into said processor means;

comparing said at least a portion of said component position data and at least a portion of said position data to verify the accuracy of said tooling.

* * * * *